United States Patent
Alexander et al.

(10) Patent No.: US 11,037,391 B1
(45) Date of Patent: Jun. 15, 2021

(54) SYSTEMS AND METHODS FOR ATM DEPOSIT JAMMED ITEM IMAGING AND TRANSACTION COMPLETION

(71) Applicant: Wells Fargo Bank, N.A., San Francisco, CA (US)

(72) Inventors: Galen Alexander, San Francisco, CA (US); Jonathan Baker, San Francisco, CA (US); Jason Cain, San Francisco, CA (US); Frank Digangi, San Francisco, CA (US); Tom Florian, San Francisco, CA (US); Stephen Fry, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/927,037

(22) Filed: Jul. 13, 2020

(51) Int. Cl.
*G07D 11/237* (2019.01)
*G07F 19/00* (2006.01)
*G06Q 20/32* (2012.01)

(52) U.S. Cl.
CPC ....... *G07D 11/237* (2019.01); *G06Q 20/3276* (2013.01); *G07F 19/202* (2013.01); *G07F 19/209* (2013.01)

(58) Field of Classification Search
None
See application file for complete search history.

(56) References Cited

U.S. PATENT DOCUMENTS

| | | | |
|---|---|---|---|
| 5,010,238 A * | 4/1991 | Kadono | G07F 19/207 235/379 |
| 7,086,584 B2 | 8/2006 | Stoutenburg et al. | |
| 7,905,400 B2 | 3/2011 | Stoutenburg et al. | |
| 8,437,528 B1 | 5/2013 | Csulits et al. | |
| 8,644,585 B1 | 2/2014 | Mennie et al. | |
| 8,787,652 B1 | 7/2014 | Jones et al. | |
| 9,004,353 B1 | 4/2015 | Block et al. | |
| 9,355,295 B1 | 5/2016 | Jones et al. | |
| 9,355,530 B1 | 5/2016 | Block et al. | |
| 9,519,896 B2 | 12/2016 | Block et al. | |
| 9,607,483 B2 | 3/2017 | Block et al. | |
| 9,805,346 B2 | 10/2017 | Johnson | |
| 9,830,581 B2 | 11/2017 | Block et al. | |
| 10,165,056 B2 | 12/2018 | Mande et al. | |

(Continued)

*Primary Examiner* — Kristy A Haupt
(74) *Attorney, Agent, or Firm* — Foley & Lardner LLP

(57) ABSTRACT

Systems, methods, and apparatuses for ATM deposit jammed item imaging and transaction completion are described herein. An ATM senses a jammed document deposit and creates an incident data packet including transaction information. The incident data packet is received and saved by the provider computing system for future transaction matching. A scannable code is displayed to link the scanned document to the incident. A servicer is notified to retrieve and generate a scanned image of a jammed document using a servicer device. The servicer scans the scannable code using the servicer device and causes the servicer device to decode the scannable code to determine incident-related information. The image may be assessed for quality in real time, and depending on quality, transmitted, along with the incident-related information, such as an incident identifier and/or additional transaction information, by the servicer device to a provider computing system for completing the transaction.

20 Claims, 6 Drawing Sheets

(56) References Cited

U.S. PATENT DOCUMENTS

| | | |
|---|---|---|
| 10,176,466 B2 | 1/2019 | Block et al. |
| 10,452,906 B1 | 10/2019 | Mennie et al. |
| 2008/0128488 A1* | 6/2008 | Ryan .................. G07F 19/202 <br> 235/379 |
| 2011/0258090 A1 | 10/2011 | Bosch et al. |
| 2014/0081858 A1 | 3/2014 | Block et al. |
| 2014/0279492 A1 | 9/2014 | McGraw et al. |
| 2015/0294431 A1 | 10/2015 | Fiorucci et al. |
| 2015/0363755 A1* | 12/2015 | Walden ................ G07F 19/202 <br> 705/43 |
| 2019/0075172 A1 | 3/2019 | Mande et al. |
| 2020/0097933 A1 | 3/2020 | Walden et al. |

\* cited by examiner

SYSTEMS AND METHODS FOR ATM DEPOSIT JAMMED ITEM IMAGING AND TRANSACTION COMPLETION

TECHNICAL FIELD

The present disclosure relates to systems and methods for ATM deposit jammed item imaging and transaction completion.

BACKGROUND

Automated teller machines (ATMs) are a convenient way for customers to complete financial transactions, including document deposits. ATMs may be placed and accessed by customers at various geographic locations, such as bank locations, convenience stores, or other stores to facilitate an account holder's interaction with the banking systems. During document deposits, the deposited documents may become jammed in the ATM before a transaction is completed. A jammed document can cause delays in the processing of the transaction, and in some cases, may further cause the loss of the jammed document.

SUMMARY

At least one arrangement relates to a method for completing jammed automated teller machine (ATM) transactions. The method comprises detecting, by a financial institution transaction system, a failed transaction due to a jammed document deposit. The method further comprises generating, by the financial institution transaction system, an incident data packet for the failed transaction. The method further comprises notifying, by the financial institution transaction system, a servicer of a jammed document within the ATM. The method further comprises generating, by the financial institution transaction system, a scannable code associated with incident data packet information, and causing an ATM to display the scannable code for scanning by a servicer mobile device. The method further comprises receiving, by the financial institution transaction system, an image data packet from the servicer mobile device, the image data packet comprising additional transaction information and an image of the jammed document. The method further comprises extracting, by the financial institution transaction system, the additional transaction information from the image of the jammed document. The method further comprises completing, by the financial institution transaction system, the failed transaction based on the additional transaction information.

Another arrangement relates to a financial institution transaction system. The financial institution transaction system comprises an automated teller machine (ATM), a servicer device, and a provider computing system. The provider computing system comprises a network interface and a processing circuit. The network interface structured to facilitate data communication with the ATM and the servicer device via a network. The processing circuit comprises a processor and a memory. The processing circuit is structured to detect a failed transaction due to a jammed document deposit. The processing circuit is further structured to generate an incident data packet for the failed transaction. The processing circuit is further structured notify a servicer of a jammed document within the ATM. The processing circuit is further structured to generate a scannable code associated with incident data packet information, and causing the ATM to display the scannable code for scanning by a servicer mobile device. The processing circuit is further structured to receive an image data packet from the servicer mobile device, the image data packet comprising additional transaction information and an image of the jammed document. The processing circuit is further structured to extract the additional transaction information from the image of the jammed document. The processing circuit is further structured to complete the failed transaction based on the additional transaction information.

Another arrangement relates to a non-transitory computer readable medium having computer-executable instructions embodied therein that, when executed by at least one processor of a computing system, cause the computing system to perform operations to complete jammed ATM transactions. The operation comprises detecting a failed transaction due to a jammed document deposit. The operation further comprises generating an incident data packet for the failed transaction. The operation further comprises notifying a servicer of a jammed document within the ATM. The operation further comprises generating a scannable code associated with incident data packet information, and causing an ATM to display the scannable code for scanning by a servicer mobile device. The operation further comprises receiving an image data packet from the servicer mobile device, the image data packet comprising additional transaction information and an image of the jammed document. The operation further comprises extracting the additional transaction information from the image of the jammed document. The operation further comprises completing the failed transaction based on the additional transaction information.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
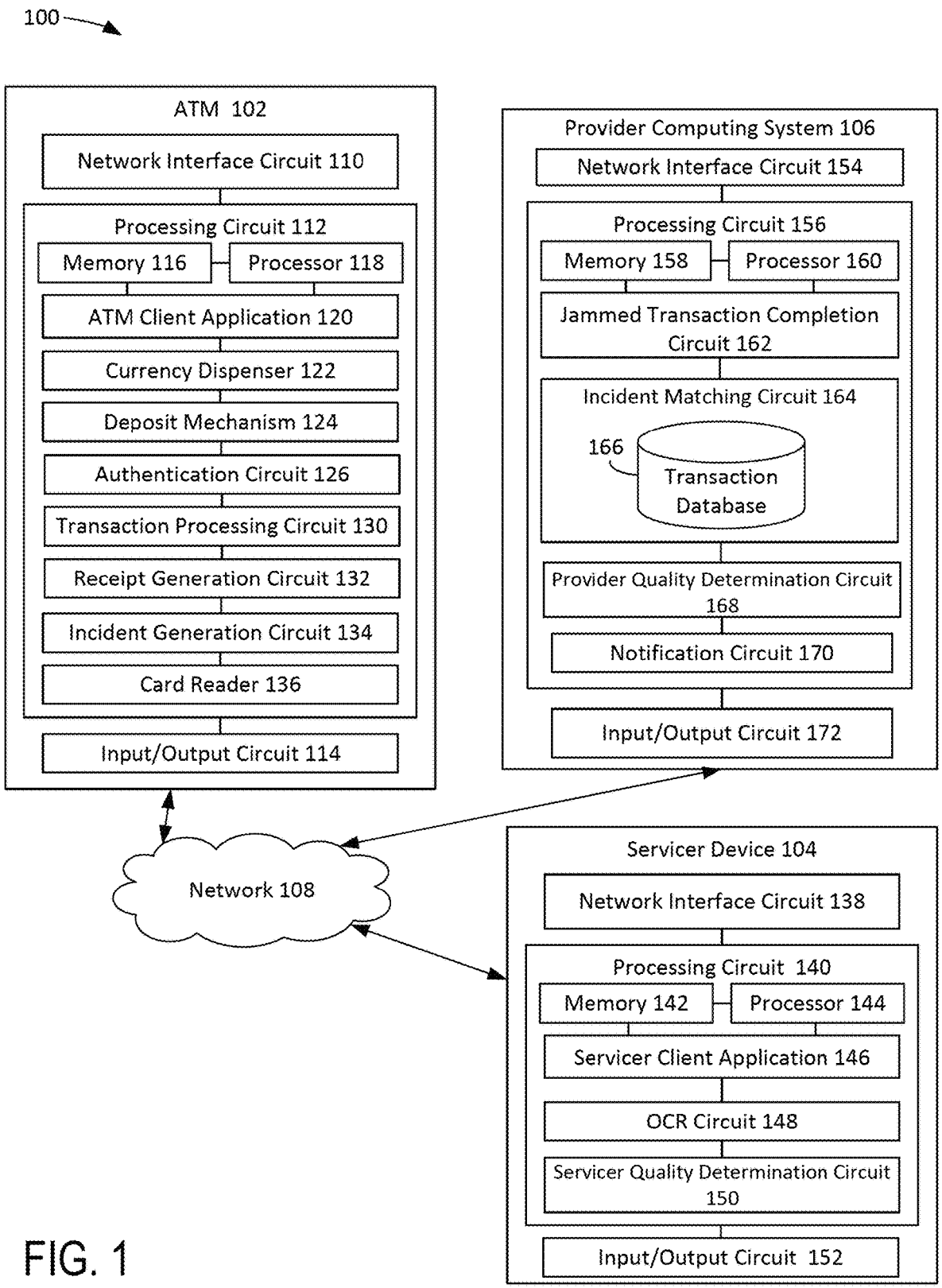
FIG. 1 is a component diagram of a document deposit system, according to an example arrangement.

Referring generally to the figures, systems and methods for ATM deposit jammed item imaging and transaction completion are disclosed. The systems and methods described herein enhance the processing of jammed documents by utilizing a servicer device structured to securely capture an image of a jammed document, determine the quality of the image at the point of service such that any necessary document rescans can be performed at the point of service, and securely transmit the image of the jammed document to a computer system structured to complete the transaction based on data elements extracted from the jammed document and/or provided by the customer via an ATM.

The embodiments of the ATM deposit jammed item imaging and transaction completion system as described herein improve jammed document processing technology by performing certain steps that cannot be done by conventional document deposit systems or human actors. For example, the document deposit system may reduce the number of transmissions necessary to complete the retrieved jammed document by determining the quality of the document prior to sending and prompting the servicer to perform a document rescan, as necessary.

The embodiments of the ATM deposit jammed item imaging and transaction completion system may utilize a scannable code which may include a static, dynamic, and/or password protected scannable code. The utilization of a scannable code improves computer technology in that it may increase security of transaction information and/or allow for updates to the transaction information after creation of the scannable code without the need to regenerate the scannable code at the ATM. For example, in some embodiments, an ATM may generate (or cause a remote computing system to generate and transmit to the ATM) and display a dynamic scannable code, such as a dynamic QR code. The ATM may generate or cause to be generated a transaction profile and/or an incident report that may include data provided by the customer to the ATM using a card (e.g., a debit card). The ATM may cause to be generated a hyperlink structured to allow a user to access the transaction profile and/or the incident report. A servicer may retrieve a jammed document from the ATM and generate a scanned image of the jammed document using a servicer device. The servicer device may perform (or cause a remote computing system to perform) optical character recognition (OCR) operations on the document image and extract further transaction information, such as the financial institution, transaction amount, account information, etc. The servicer may further manually enter transaction information from the retrieved document when prompted by the servicer device. As such, the servicer device may cause the information stored at the location indicated by the hyperlink to be updated. In some embodiments, the information stored at the location indicated by the hyperlink may be supplemented or updated prior to allowing the servicer to scan the scannable code. For example, the ATM may receive from a remote computing system additional bank identifying information, account information, system information, etc. to complete the transaction profile and/or the incident report.

The transaction information may also be made more secure by utilizing authentication measures that may include the requirement for the servicer to use biometric data as well as other multi-level servicer authentication operations as described further herein.

In an example illustrative scenario, the ATM may sense (e.g., identify using signals received from document jam sensors positioned in the document feeder path within the ATM) a jammed document and create an incident data packet. The incident data packet may generate and assign a transaction specific identifier and include information about the depositor, such as depositor name and account identifier, the time and date of the failed transaction, the identifier of the ATM where the jam occurred, etc. A servicer may be notified to retrieve the jammed document via an electronic message (alert, notification, etc.) transmitted to a computing device of the servicer. The ATM may generate and/or display a scannable code that can be scanned using the servicer device. The code or a portion thereof may link the incident data packet to the retrieved document. The servicer may scan the front and/or back of the retrieved document as prompted by the servicer device. In some embodiments, the servicer device may comprise circuitry structured to perform a quality analysis of the document, which may include determining whether the image quality is low and prompting a re-scan, and/or whether the document quality is low, prompting the servicer to send the physical document retrieved from the ATM to the provider location. In some embodiments, the servicer may input data from the physical document (e.g., account identifier, account name, deposit amount, etc.) via a user interface provided by the servicer device to supplement the transaction profile. In some embodiments, if the quality is determined to be above a predetermined threshold, the scanned image may be electronically transmitted with the incident data packet to the provider computing system to process the transaction.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a component diagram of a document deposit system 100 for processing jammed document deposits by a servicer to the automated teller machine (ATM) 102. The document deposit system 100 generates an incident identifier to ensure that the particular jammed deposit can be processed efficiently and that the jam event can be linked to a particular transaction. Further, the servicer device 104 and/or the provider computing system 106 are structured to determine the quality of the scanned document to ensure the physical document is sent to the provider if the quality is not sufficient to complete the transaction using the scanned document image.

As shown, the document deposit system 100 includes an ATM 102, servicer device 104, and a provider computing system 106. The ATM 102, servicer device 104, and/or provider computing system 106 are in communication with each other and are connected by a network 108. The ATM 102 may include a network interface circuit 110, processing circuit 112, and an input/output circuit 114.

As shown, the network interface circuit 110 is structured to establish connections with the provider computing system 106 by way of the network 108. The network interface circuit 110 includes programming and/or hardware-based components that connect the ATM 102 to the network 108. For example, the network interface circuit 110 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 110 includes the hardware and machine-readable media structured to support communication over multiple channels of data communication (e.g., wireless, Bluetooth, near-field communication, etc.) Further, in some arrangements, the network interface circuit 110 includes cryptography module(s) to establish a secure communication session (e.g., using the IPSec protocol or similar) in which data communicated over the session is encrypted and securely transmitted.

To support the features of the ATM, the network interface circuit 110 provides a relatively high-speed link to the network 108, which may be any combination of a local area network (LAN), an intranet (e.g., a private banking or retailer network), the Internet, or any other suitable communications network, directly or through another interface.

The processing circuit 112, as shown, comprises a memory 116, a processor 118, and an ATM client application 120. The memory 116 includes one or more memory devices (e.g., RAM, NVRAM, ROM, Flash Memory, hard disk storage) that store data and/or computer code for facilitating the various processes described herein. That is, in operation and use, the memory 116 stores at least portions of instructions and data for execution by the processor 118 to control the processing circuit 112. The memory 116 may be or include tangible, non-transient volatile memory and/or non-volatile memory. The processor 118 may be implemented as a general-purpose processor, an application specific integrated circuit (ASIC), one or more field programmable gate arrays (FPGAs), a digital signal processor (DSP), a group of processing components, or other suitable electronic processing components.

The ATM 102, as shown, is configured to run a variety of application programs and store associated data in a database of the memory 116. One such application may be the ATM client application 120. The ATM client application 120 includes computer-executable code stored in the memory 116. The ATM client application 120 is structured to guide a user in performing transactions through the ATM 102 utilizing the display and other circuits. The ATM client application 120 may also be structured to generate a notification for the servicer through the servicer device 104 when a document has jammed in the ATM 102. According to various embodiments, the notification may include a push alert, a text message, and/or an email message. The notification may be transmitted to the servicer device 104 via the network 108.

The input/output circuit 114 is structured to receive communications from and provide communications to the user of the ATM 102 (e.g., a customer user of the ATM, servicer of ATM). In this regard, the input/output circuit 114 is structured to exchange data, communications, instructions, etc. with an input/output component of the ATM 102. Accordingly, in one embodiment, the input/output circuit 114 includes an input/output device, such as a touchscreen. In another embodiment, the input/output circuit 114 includes communication circuitry for facilitating the exchange of data, values, messages, and the like between an input/output device and the components of the ATM 102. In yet another embodiment, the input/output circuit 114 includes machine-readable media for facilitating the exchange of information between an input/output device and the components of the ATM 102. In still another embodiment, the input/output circuit 114 includes any combination of hardware components, communication circuitry, and machine-readable media. Hardware components can include a touchscreen, a keypad, microphone, camera, or buttons for receiving user inputs. Components of the input/output circuit 114 display instructions, status notification and other information (e.g., the scannable code) to the user. The display (e.g., the touchscreen) may be configured to display graphics such as menus, instructions, background photos (e.g., advertisements, etc.), logos, and so on. In one embodiment, the display is a touchscreen display that is capable of detecting user touches, e.g., to make menu selections. The display allows the account holder or a third party user to interact with the ATM 102 in order to process transactions.

The display presented to the ATM user via the ATM client application 120 may provide a prompt for the user to select the type of transaction the user would like to complete. The ATM client application 120 may also be structured to allow the user to select the desired language the user would like to proceed using, among other functions.

The ATM 102, as shown, may include a currency dispenser 122, deposit mechanism 124, authentication circuit 126, transaction processing circuit 130, receipt generation circuit 132, and incident generation circuit 134. The ATM 102 can serve as a terminal for a user, such as a user that has an account with the bank or financial institution associated with the provider computing system 106, to carry out financial transactions in conjunction with the user's account at the bank. Such transactions can include, for example, withdrawals, deposits, transfers of funds between accounts, and other financial transactions. In some arrangements, the ATM 102 is maintained by the bank that holds the user's account. In other arrangements, the ATM 102 is maintained by a different entity.

The currency dispenser 122 may dispense currency notes ("cash") or other forms of currency to an account holder from the account holder's financial institution accounts. The currency dispenser 122 may be configured to dispense currency in various denominations, as specified by the account holder. The deposit mechanism 124 may be configured to accept deposits of currency, such as envelope or envelope-free deposits of cash and/or checks. The deposit mechanism 124 may be further configured to detect if a document has become jammed in the ATM 102. In some embodiments the deposit mechanism 124 may comprise a feeder, scanner, return path, and/or sensors to determine when a document has jammed. In some embodiments, the sensors may include strain sensors on feeder components to determine when the feeder is unable to move the jammed document, infrared sensors along the path of the document to determine where the document has jammed, as well as other jam determination methods. In some embodiments, the deposit mechanism 124 has the ability to clear jammed documents, so further deposits can be made prior to a servicer retrieving the jammed document.

In some embodiments, the servicer device 104 can securely pair with the ATM 102 via Bluetooth, near field communication (NFC), etc. For example, the ATM client application 120 may detect the presence of the servicer device 104 within its communication range, and/or the servicer device 104 may detect the ATM 102 within its range. The ATM 102 may receive a servicer password entered using the touchscreen and/or the keypad of the ATM 102. In response to receiving the servicer password and authenticating the servicer, the ATM client application 120 may generate a one-time code and display the one-time code via the touchscreen. The servicer device 104 may generate a user interface structured to allow the servicer user to enter the one-time code. Upon ensuring a match between the entered code and a copy of the one-time code received from the ATM 102, the service device 104 may pair to the ATM 102 such that data can be exchanged via a short-range communication protocol between the two devices. Utilizing the connection between the servicer device 104 and the ATM 102, the servicer may prompt the ATM 102, from the servicer device 104, to return the jammed document, clear the jammed document if not done previously, etc. In some embodiments, the short-range communication protocol can be bypassed such that the devices are paired via the network 108 after the servicer enters the servicer password using the touchscreen of the ATM 102. In some embodiments, the ATM 102 may include an asset tag (e.g., an RFID tag) scannable and decodable by the servicer device 104 to determine the device information related to the ATM 102, such as the serial number, model, location, etc. In some embodiments, instead or in addition to pairing to the ATM 102, the servicer device 104 may be structured to access, at a remote computing system, incident information and the transaction profile generated and transmitted to the remote computer system by the ATM 102.

The authentication circuit 126 of the ATM 102 may be configured to authenticate information received by the ATM 102 to approve or reject a transaction. The authentication circuit 126 may approve or deny authentication for transaction data received by the ATM 102. The authentication circuit 126 authenticates a user as being a valid account holder associated with the transaction card and the corresponding account at the bank or financial institution. In some embodiments, the authentication circuit 126 may prompt the user to enter a personal identification number (PIN) to verify that the user's identity matches the card entered to start the transaction. The authentication circuit 126 may relay the PIN to the provider computing system 106 to verify it matches the PIN of the card. If the PIN matches, the authentication circuit 126 allows the transaction to proceed. In further embodiments, the authentication circuit 126 contains a near-field communication (NFC) circuit and transceiver that allows users to complete the authentication process on user device by entering a PIN, password, biometric data, etc.

The transaction processing circuit 130 processes each transaction requested by the account holder or a third party user. For example, the transaction processing circuit 130 may cooperate with jammed transaction completion circuit 162 the provider computing system 106 to ensure that transactions are properly debited/credit to the account held by the user. The receipt generation circuit 132 generates a receipt for each transaction.

The incident generation circuit 134 may be configured to determine when a deposited document has jammed and generate an incident data packet for the failed transaction. In some embodiments, the incident data packet contains a transaction specific incident identifier, the user name and account identifier obtained from the card used by the customer, the location, time, and date of the failed deposit, etc. In some embodiments, the incident data packet may be electronically transmitted to the provider computing system 106 to further track and notify the servicer device 104 of a jammed document. In further embodiments, the incident generation circuit may generate a scannable code that is able to be scanned by the servicer device 104 prior to, during, or upon extraction of the document. According to various embodiments, the scannable code may include an alphanumeric code, a digital image, a QR code, a bar code, etc.

The card reader 136 may be configured to read information from a transaction card. The transaction card may include many different types of cards, for example, a credit card, debit card, check card, ATM card, stored value card, or the like. The card reader 136 may be configured to scan information from a magnetic stripe ("magstripe") of a transaction card. Some transaction machines may require the user to "dip" or "swipe" their transaction card, while other transaction machines may require the user to insert their transaction card, in which case the user's card may be retained by the machine for the duration of the session. Alternatively, the card reader 136 may be configured to communicate with the transaction card via near field communications (NFC). While performing the read operation, the card reader 136 may be configured to read the account information and the PIN associated with the card and the account.

The servicer device 104 as shown may be any suitable user computing device. For example, the servicer device 104 may be a mobile phone, a personal computer (e.g., a desktop computer or a laptop computer), a tablet, a wearable device (e.g., a smart watch), an augmented reality device, or any other suitable user computing device capable of accessing and communicating using local and/or global networks.

The servicer device 104 may include a processing circuit 140, a network interface circuit 138, and an input/output circuit 152. The processing circuit 140, the network interface circuit 138, and the input/output circuit 152 may function substantially similar to and include the same or similar components as the processing circuit 112, the network interface circuit 110, and the input/output circuit 114 described above, with reference to the ATM 102. Accordingly, it will be understood that the description of the processing circuit 112, the network interface circuit 110, and the input/output circuit 114 provided above may be applied to the processing circuit 140, the network interface circuit 138, and the input/output circuit 152 of the servicer device 104. In some embodiments, the input/output circuit 152 may include a camera (e.g., standard, ultra-wide, telephoto) and/or a scanner. These devices may be structured to scan or capture images of the ATM display and/or a document.

For example, the processing circuit 140, as shown, includes a memory 142, a processor 144, the servicer client application 146, the data optical character recognition (OCR) circuit 148, and the servicer quality determination circuit 150. The servicer device 104 is configured to run a variety of application programs and store associated data in a database of the memory 142. One such application may be the servicer client application 146. The servicer client application 146 may be structured to notify the servicer of a jammed document deposit within the ATM 102 by displaying a push notification, a text message, and/or an email notification received from the ATM 102. The servicer client application 146 may be further structured to assist the servicer in finding the ATM 102 that has jammed by utilizing a GPS location of the ATM 102 (e.g., extracted from the notification received from the ATM 102), determining a current GPS location of the servicer device 104 using a GPS sensor of the servicer device 104, and generating navigational instructions to the ATM 102.

The servicer client application 146 may be structured to provide the servicer with the ability to receive notifications from the provider computing system 106 when a jam occurs at the ATM 102 serviced by the servicer. In some embodiments, upon authenticating and/or pairing the servicer device 104 to the ATM 102, the servicer client application 146 prompts the user to scan the scannable code from the ATM 102 and/or enter manually the incident identifier presented by the display of the ATM 102 following a jam. The servicer client application 146 may prompt the servicer to scan the previously jammed document to allow for further processing and completion of the failed transaction. Accordingly, the servicer client application 146 is communicably coupled to the provider computing system 106 (e.g., the jammed transaction completion circuit 162). The servicer client application 146 may be downloaded by the servicer device 104 prior to its usage, hard coded into the memory 142 of the servicer device 104, or be a cloud-based and/or a web-based interface application such that the servicer device 104 may display a web browser navigable to the application. According to various embodiments, modules of the servicer client application 146 may be locally installed on the servicer device 104 and/or may be remotely accessible (e.g., via a browser-based interface) and served from the provider computing system 106, such that the provider computing system 106 causes the servicer client application 146 to execute various operations.

The servicer device 104 may include an optical character recognition (OCR) circuit 148. The OCR circuit 148 may include computer-executable instructions structured to extract information from the imaged jammed document. In one embodiment, the OCR circuit 148 may be structured to parse out text fields from the scanned image and to determine the payor name and account identifier of a check deposit, the check quantity, date of the check and/or the name of the payee.

The servicer device 104 may further utilize a servicer quality determination circuit 150. The servicer quality determination circuit 150 may use a number of inputs to determine the quality of the previously to determine the quality of the previously jammed document including the quality of the optical character recognition from the OCR circuit 148, and an analysis of any folds, tears, stains, etc.

In some embodiments, the servicer quality determination circuit 150 may determine a quality level associated with a document. For example, in some instances, the quality level may be a percentage, a numerical quality score (e.g., a quality score between one and ten), and/or a descriptive quality score (e.g., low, medium, high). In some instances, the servicer quality determination circuit 150 may not be able to determine, based on the scanned image of the document, what the document states, such as when the OCR process fails or when only a predetermined number of parsed out text fields, relative to the total number, can be read (e.g., under 5 out of 10 text field items). In these instances, the servicer quality determination circuit 150 may assign a low quality level (e.g., 10%, 50%, one, low). The quality determination circuit may prompt the servicer to scan the document again and/or send the physical document to the provider. In some instances, the servicer quality determination circuit 150 may be very confident in the quality of the document. In these instances, the servicer quality determination circuit 150 may assign a high confidence level (e.g., 90%, ten, high). With a quality determination over a certain threshold (e.g., in the high confidence level range), the servicer can be confident that the transaction can be processed without needing to send the physical document to the provider.

In an example embodiment, a provider computing system 106 may be operated by a bank or other financial institution. The provider computing system 106 is configured to receive various transactional data from the ATM 102 and/or the servicer device 104 via the network 108, analyze the data and determine if the transaction can be processed. The provider computing system 106 may include a processing circuit 156, a network interface circuit 154, and an input/output circuit 172. The processing circuit 156, the network interface circuit 154, and the input/output circuit 172 may function substantially similar to and include the same or similar components as the processing circuit 112, the network interface circuit 110, and the input/output circuit 114 described above, with reference to the ATM 102. Accordingly, it will be understood that the description of the processing circuit 112, the network interface circuit 110, and the input/output circuit 114 provided above may be applied to the processing circuit 156, the network interface circuit 154, and the input/output circuit 172 of the provider computing system 106.

The processing circuit 156 includes a memory 158 and a processor 160. The processing circuit 156 further includes a jammed transaction completion circuit 162, which may include or be communicatively coupled to an incident matching circuit 164, a transaction database 166, a provider quality determination circuit 168, and a notification circuit 170. The provider computing system 106 is configured to run a variety of application programs and store associated data in a database of the memory 158. One such application may be the jammed transaction completion circuit 162. The jammed transaction completion circuit 162 may be structured to verify that the password and/or PIN entered by the user at the ATM 102 are associated with the account identifier of the card entered at the ATM 102 to start the transaction or retrieval process, respectively. The jammed transaction completion circuit 162 may be structured to verify the password and/or PIN entered by the servicer at the ATM 102 to authenticate the servicer. The jammed transaction completion circuit 162 may be structured to determine the correct servicer device 104 to notify in the case of a jammed deposit at the ATM 102 (e.g., by evaluating a GPS location transmitted by the servicer device 104 relative to the GPS location of the ATM 102). The jammed transaction completion circuit 162 may be structured to verify and validate device pairing information (e.g., timestamp, device identifier(s), device serial number(s), etc.) to validate the pairing between the ATM 102 and the servicer device 104.

The jammed transaction completion circuit 162 is configured to collect (e.g., receive an electronic transmission of) incident data from the ATM 102 and/or the servicer device 104 through the ATM client application 120 and/or the servicer client application 146, respectively. The provider computing system 106 may be configured to use the necessary information obtained from the ATM 102 and the servicer device 104 to process and, in some embodiments, complete a previously failed transaction. In an example embodiment, the provider computing system 106 receives an incident data packet and/or transaction profile information from the ATM 102 via the ATM client application 120. The jammed transaction completion circuit 162 can add the incident data packet and/or transaction profile information to the transaction database 166 and notify the servicer via the notification circuit 170. With scanned images of the failed document transaction obtained, the provider quality determination circuit 168 can ensure the image is of a permissible determined quality and match the failed transaction to the incident data packet at the incident matching circuit 164. The jammed transaction completion circuit 162 may generate, upon receiving an electronically transmitted request from the ATM 102, a hyperlink structured to allow a user (e.g., servicer, internal user, etc.) to access the transaction profile and/or the incident report, and transmit the hyperlink to the ATM 102 for inclusion in the scannable code generated at the ATM 102. In some embodiments, the jammed transaction completion circuit 162 may generate, in response to an electronically transmitted request from the ATM 102 and/or the servicer device 104, a password associated with the scannable code such that information decodable by the servicer device 104 from the scannable code (which may be static or dynamic) is further protected by a password. The jammed transaction completion circuit 162 may be structured to transmit the password to the ATM 102 (e.g., to be encoded as a portion of the scannable code) and/or to the servicer device 104. Advantageously, this represents a technological improvement of multi-level authentication for operations performed by or from the servicer device 104.

The incident matching circuit 164 works in combination with the transaction database 166 to match the failed transaction to the jammed document scanned by a servicer using the servicer device 104. The incident matching circuit may take into account many criteria when matching a failed transaction, including ATM location, stated deposit value, names of payor and payee, account identifiers of payor and payee, etc.

In some embodiments, the provider quality determination circuit 168 may determine a quality level associated with a document. For example, in some instances, the quality level may be a percentage, a numerical quality score (e.g., a quality score between one and ten), and/or a descriptive quality score (e.g., low, medium, high). In some instances, the provider quality determination circuit 168 may not be able to determine, based on the scanned image of the document, what the document states, such as when the OCR process fails or when only a predetermined number of parsed out text fields, relative to the total number, can be read (e.g., under 5 out of 10 text field items). In these instances, the provider quality determination circuit 168 may assign a low quality level (e.g., 10%, 50%, one, low). The quality determination circuit may prompt the servicer to scan the document again, or send the physical document to the provider. In some instances, the provider quality determination circuit 168 may be very confident in the quality of the document. In these instances, the provider quality determination circuit 168 may assign a high confidence level (e.g., 90%, ten, high). With a quality determination over a certain threshold (e.g., in the high confidence level range), the servicer can be confident that the transaction can be processed without needing to send the physical document to the provider.

In example embodiments, the notification circuit 170 receives an incident data packet from the ATM 102. With the identifier of the ATM 102, the notification circuit 170 would notify the servicer responsible for clearing the jam via the servicer device 104. The notification can be in the form of a text message, electronic mail, push notification, etc.

Figure 2:
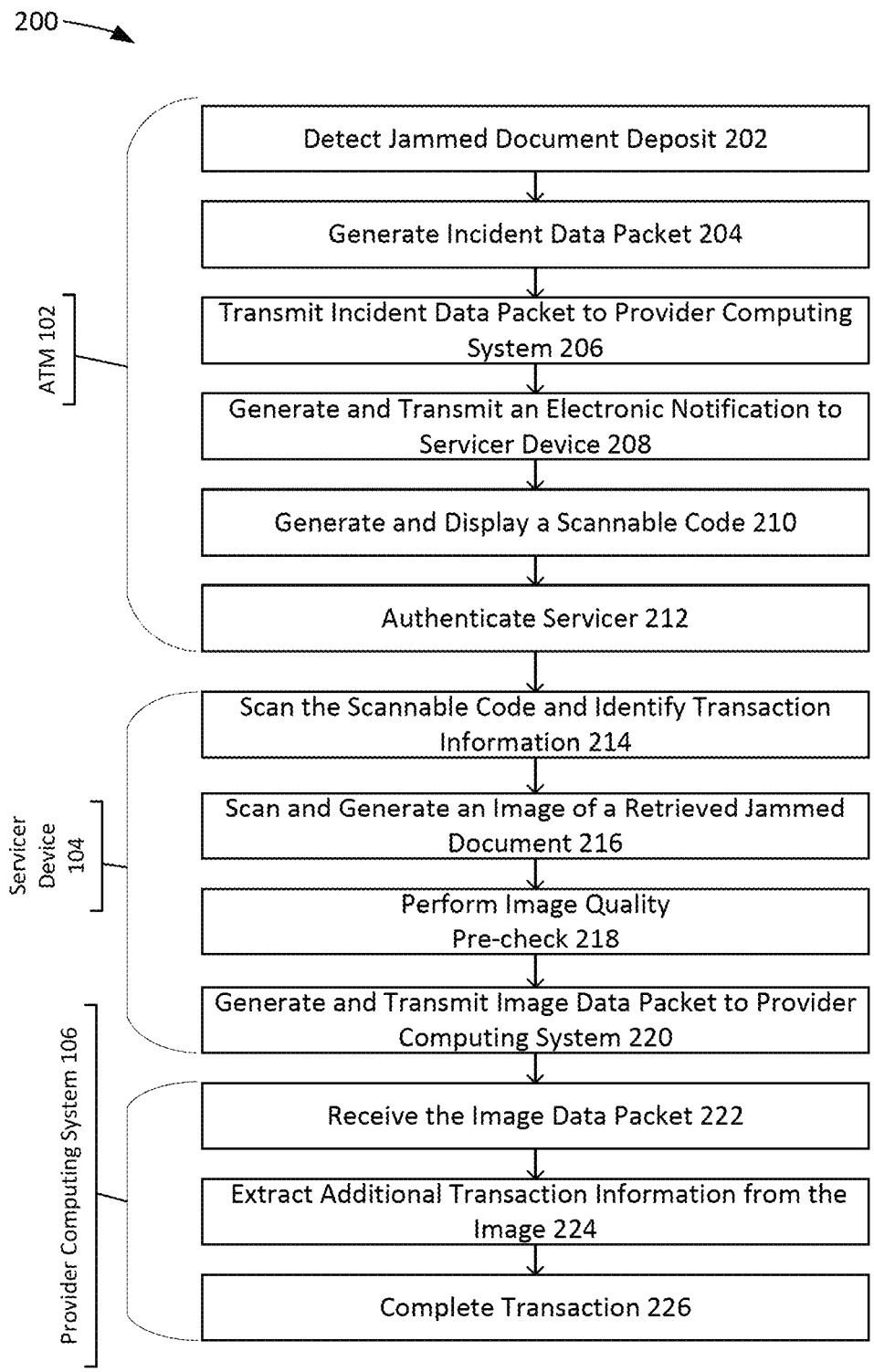
FIG. 2 is flow diagram of a method for processing a jammed ATM deposit, according to an example arrangement.

Referring to FIG. 2, a flow diagram of method 200 for processing a jammed ATM deposit is shown, according to an example arrangement. Operations of the method 200 may be conducted by the document deposit system 100 (e.g., ATM 102, servicer device 104, and provider computing system 106). Through operations of the method 200, the provider computing system 106 receives transaction data from the ATM 102, notifies the servicer device 104, and subsequently receives further transaction information from the servicer device 104.

As shown, the method 200 begins by the ATM 102 detecting a jammed document deposit at step 202. In some embodiments the ATM 102 may clear the jammed document to a receptacle that holds the previously jammed documents until the servicer arrives to allow for further deposits at the ATM 102. In some scenarios, ATM 102 may jam multiple times prior to the servicer arriving. In such situations, the ATM 102 may clear the multiple jams to the receptacle until the servicer arrives to allow for further deposits at the ATM 102.

Further, the ATM 102 may generate an incident data packet at step 204. The incident data packet may comprise a transaction specific incident identifier, the name and account identifier of the depositor, account suffix (e.g., checking, savings, money market, etc.), stated transaction amount, and the time and date of the failed transaction. The depositor name and account identifier can be obtained from the card used to initiate transaction. The stated transaction amount is the value of the document as stated by the depositor at the time of the transaction. In some embodiments, multiple documents have jammed prior to the arrival of the servicer, and in this case, the incident data packet may include multiple incident identifiers and associated transaction information. In further embodiments, the servicer may be provided with the incident identifier and a scannable code and the servicer device 104 may be structured to use the incident identifier, which may be decoded from the scannable QR code or received separately, to access other related incident and/or transaction profile data at the provider computing system 106 (e.g., via a link associated with the QR code, via a client application, etc.). The incident data packet is transmitted to the provider computing system 106 at step 206. The incident data packet may be stored as a reference to further transaction information from the servicer device 104. In some embodiments, the scannable code includes some or all elements from the incident data packet.

Further, the ATM 102 may cause the provider computing system 106 to generate and transmit an electronic message to the servicer device 104 at step 208. In some embodiments, the electronic message may include a text message, email, push notification, etc. The notification may be sent through the servicer client application 146. In further embodiments the notification may be sent by the ATM 102. The electronic message may include the particular ATM location and identifier, and may include the date and time of the jammed document deposit.

Upon arrival at the ATM 102, the servicer may be authenticated. The authentication process may include the servicer using a servicer identification card in the card reader 136 followed by a servicer password and/or PIN. In another embodiment, the servicer may touch a certain section of the ATM display that may show a screen for the servicer to enter an identifier. In a further embodiment, the servicer may complete the authentication process on the servicer device 104 by entering a PIN, passcode, biometric data, etc. and communicating the authentication via an NFC circuit in the authentication circuit 126.

The ATM 102 may generate and display a scannable code to the servicer at step 210. According to various embodiments, the scannable code can be a static or dynamic QR code. In embodiments where the scannable code is a dynamic QR code, the scanning and redirection speed may be improved (e.g., due to the size of the QR code being decreased as the QR code may replace the encoded data values with a hyperlink). Furthermore, the content at the hyperlink can be updated (e.g., when additional incident, ATM, servicer device, and/or transaction information is supplied prior the jam clearing and transaction completion process) without needing to generate a new scannable code at the ATM 102. In further embodiments, the scannable code may be a password protected QR code which may require the servicer to enter a password, thus adding another layer of security.

In some embodiments, when the scannable code is scanned through the servicer device 104, the servicer device 104 decodes the QR code to extract its encoded elements, such as the hyperlink to the incident profile, transaction information, incident information, ATM information, etc. and redirects the servicer to a screen that prompts the servicer to scan the previously jammed document. In some embodiments the servicer may manually enter the incident identifier to proceed. The servicer scans the displayed scannable code and/or enters the incident identifier manually at step 212.

The servicer is prompted to scan an image of a retrieved jammed document at step 216. Using the camera of the servicer device 104, the servicer may scan an image of the front and/or back of the retrieved jammed document.

An image quality pre-check is performed at step 218. In some embodiments, the image quality pre-check is performed by a client application at the servicer device 104. In some embodiments, the image quality pre-check may determine if the image should be taken again to ensure proper lighting and alignment. In further embodiments, the quality of the document is rated depending on its condition (e.g., tears, stains, creases). If the quality of the image or document is determined to be below a set threshold, the servicer may be prompted to send the physical document to the provider for further processing. In some embodiments, the servicer device 104 also conducts optical character recognition (OCR) on the scanned image. The OCR circuit 148 may be configured to identify the payor name and account identifier and may confirm the payee name and transaction amount associated with the document.

The servicer device 104 may generate and transmit an image data packet to the provider computing system 106 at step 220. The image data packet may include images of the front and back of the retrieved jammed document and/or the information obtained from the OCR circuit 148. In some embodiments, multiple documents may have jammed prior to the servicer arriving. In these embodiments, the image data packet may include multiple individual image data packets. After the image data packet has been transmitted by the servicer device 104 at step 220, the provider computing system 106 receives the image data packet at step 222.

The provider computing system 106 may use the image data packet to extract additional information at step 224. The extracted information may include the payor's account identifier and name along with the payee name and document value. The extracted information can be compared to the information in the incident data packet to confirm a match between the failed transaction and the retrieved jammed document. In some embodiments, the image document is used to create an image replacement document (IRD) that can be used by the provider to complete the transaction.

The provider computing system 106 may be structured to complete the transaction at step 226 which was initiated by the customer through the ATM 102 using the information determined from the imaged document, as described above. Example transactions may include check deposits, cash deposits, etc. In some embodiments, the provider computing system 106 is structured to cancel a part of the intended transaction requested through the ATM 102 (e.g., a cash withdrawal request from a check intended to be deposited) and generate/transmit an electronic notification to the customer computing device.

Figure 3:
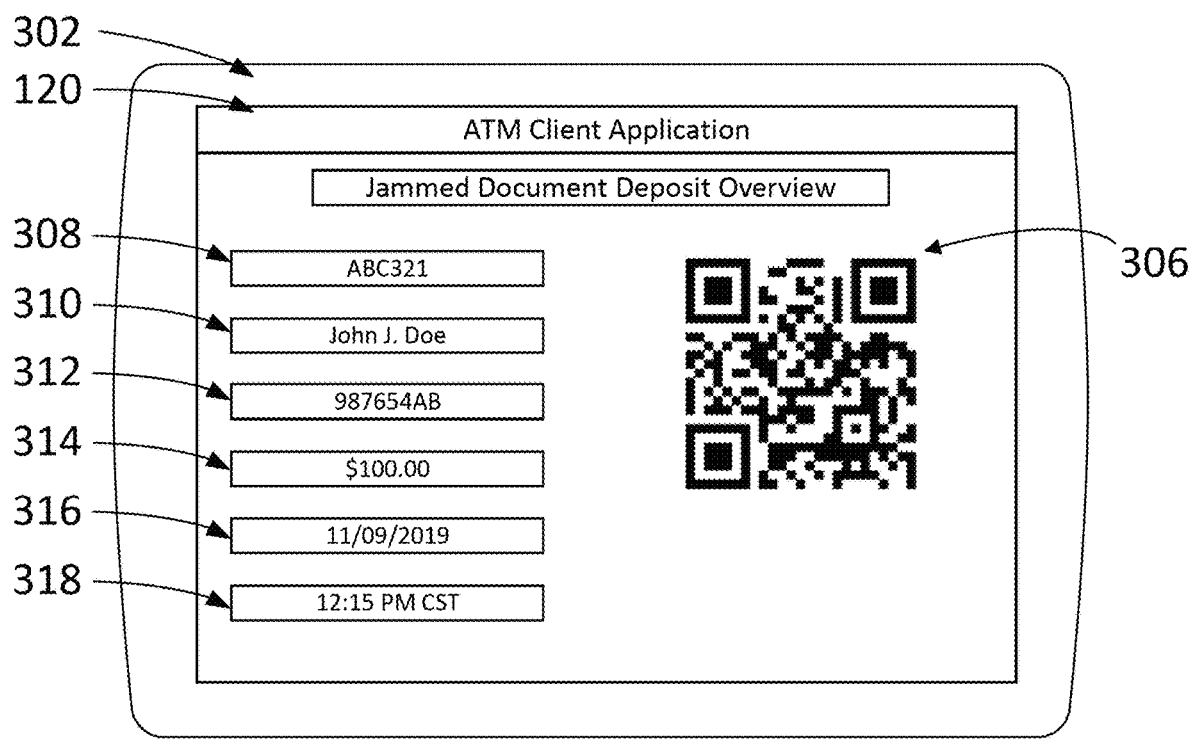
FIG. 3 is an illustration of some aspects of an ATM user interface following a jammed document deposit, according to an example arrangement.
Figure 4A:
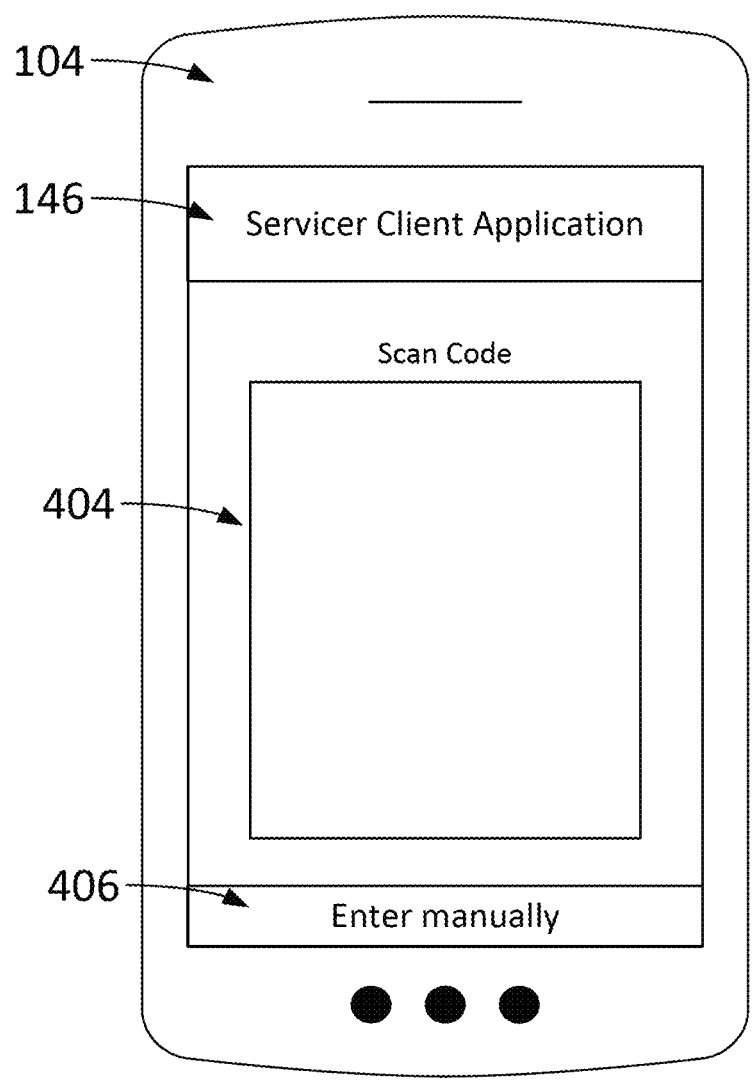
FIG. 4A is an illustration of some aspects of a servicer device user interface prompting servicer to scan the displayed quick response (QR) code, according to an example arrangement.
Figure 4B:
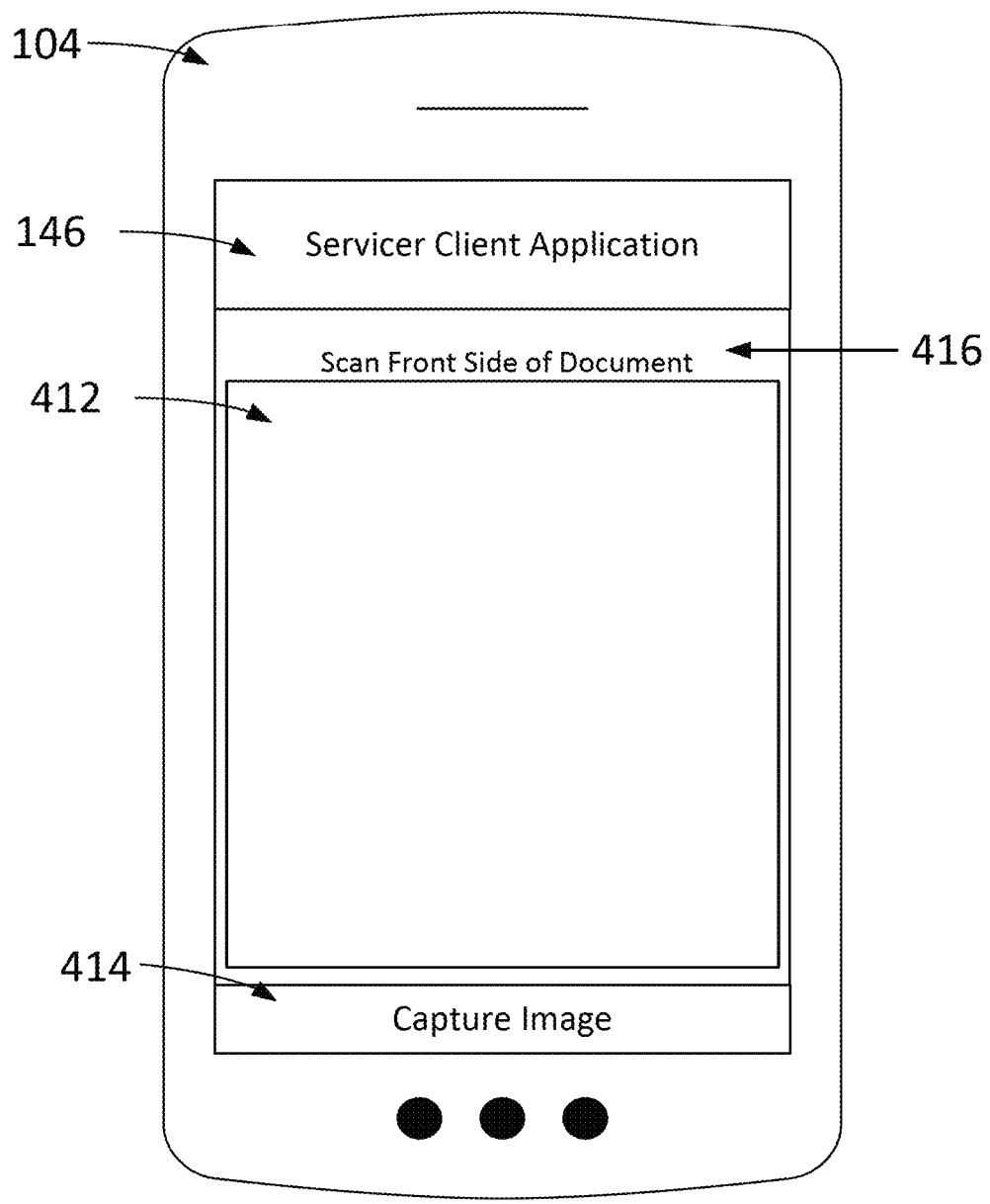
FIG. 4B is an illustration of some aspects of a servicer device user interface prompting servicer to scan the previously jammed document, according to an example arrangement.
Figure 4C:
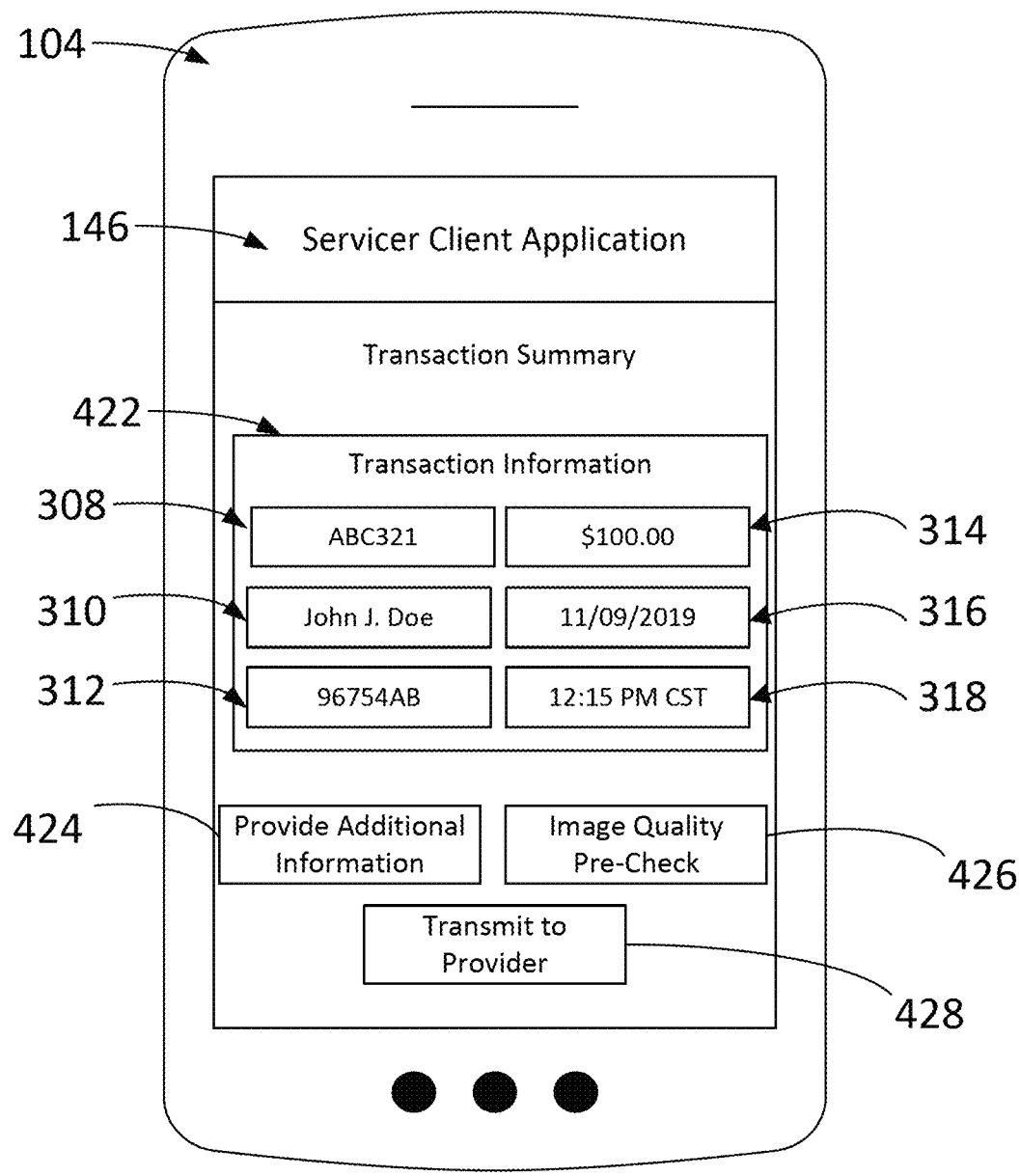
FIG. 4C is an illustration of some aspects of a servicer device user interface displaying a transaction summary after scanning the displayed QR code and previously jammed document, according to an example arrangement.

FIG. 3-4C show servicer-side aspects of an ATM deposit jammed item imaging and transaction completion process using the ATM 102 and servicer device 104, according to an example arrangement. As part of this process, a servicer may use the ATM client application 120, delivered to the servicer by the ATM 102, and the servicer client application 146, delivered by the servicer device 104 to couple the reported incident to an image of the retrieved document and/or determine the quality of the image of the retrieved document.

Referring to FIG. 3, an illustration of some aspects of an ATM 102 user interface following a jammed document deposit is shown, according to an example arrangement. The ATM display 302 may display, to the servicer via the ATM client application 120, a scannable code 306 and/or transaction information which may include an incident identifier 308, depositor name 310, depositor account identifier 312, deposit value 314, date of transaction 316, and/or time of transaction 318. In some embodiments, the provider can determine what, if any, transaction information to display. In one illustrative embodiment, the ATM 102 is located at a provider bank that is serviced by a provider employee. In this embodiment all transaction information may be presented to allow the employee to correctly match the notified incident to the retrieved jammed document. In a further embodiment, the display 302 may only show the scannable code 306 and the incident identifier 308.

Referring to FIG. 4A, an illustration of some aspects of a servicer device 104 user interface prompting servicer to scan the displayed scannable code 306 is shown, according to an example arrangement. The servicer device 104 may present through the servicer client application 146 the prompt to scan the displayed scannable code 306 of the ATM 102 or manually enter the incident identifier. The servicer client application 146 may automatically start the camera capabilities of the servicer device 104 to allow the servicer to scan the scannable code 404. In some embodiments, the scannable code 306 is automatically recognized and in other embodiments the servicer can press the screen when the scannable code 306 is displayed on the servicer device 104. In further embodiments the servicer can choose to manually enter the incident identifier 308 by pressing the enter manually button 406. The enter manually button 406 may contain any suitable user interface components for selecting application functionality, such as icons, graphics, cards, hyperlinks, etc.

Referring to FIG. 4B, an illustration of some aspects of a servicer device 104 user interface prompting servicer to scan the previously jammed document is shown, according to an example arrangement. Upon retrieving the jammed document from the ATM 102, the servicer is prompted to capture an image of the document from the servicer client application 146. In some embodiments, the servicer will be prompted to hold the servicer device 104 over the document and capture the entire document in the camera view 412. Once the document is entirely visible in the camera view 412, the servicer client application may automatically capture an image of the document. In other embodiments, the servicer may capture the image of the document by pressing the capture image button 414. The servicer client application may ensure the servicer captures an image of both sides of the document by prompting the servicer with a note regarding which side of the document should be scanned 416. In some embodiments, the servicer may tap the camera view 412 to focus the camera and/or hold the screen for an amount of time that exceeds a predetermined threshold (e.g., 500 milliseconds, 1000 milliseconds) then slide up or down to increase or decrease the brightness, respectively. The capture image button 414 may be any suitable user interface component such as an icon, graphic, card, hyperlink, etc.

Referring to FIG. 4C, an illustration of some aspects of a servicer device user interface displaying a transaction summary after scanning the displayed scannable code 306 and previously jammed document is shown, according to an example arrangement. After the previously jammed document has been scanned, a transaction summary 422 is displayed on the servicer device 104 through the servicer client application 146. The transaction summary 422 may display an overview of the acquired transaction information which may include the incident identifier 308, depositor name 310, depositor account identifier 312, deposit value 314, the date of the transaction 316, and/or the time of the transaction 318 of the original deposit. In some embodiments, the transaction summary 422 includes a list of image metadata which may include image name, image file size, date and time of image taken, etc. Below the transaction information, the servicer may have the option to provide additional information regarding the transaction by pressing the provide additional information button 424. In some embodiments, the provide additional information button 424 allows the servicer to enter notes, or manually enter names or quantities that were written on the document. Additionally, there may be an image quality pre-check button 426 which determines a quality of the image before sending to the provider. There may also be a transmit to provider button 428 that sends the image data packet to the provider computing system 106 to be processed, and in some embodiments completed. In some embodiments, the provide additional information button 424, image quality pre-check button 426, and/or the transmit to provider button 428 may be any suitable user interface component, such as, an icon, graphic, card, hyperlink, etc.

In some embodiments, the image quality pre-check button 426 can be used to ensure a high enough quality image was taken of the document. In some cases, the image may be blurry or out of focus, prompting the servicer to take the image again. In some embodiments, the image quality pre-check button can be used to determine if the quality of the document is above a certain threshold (e.g., 50%, medium, 5) that would indicate the document doesn't need to be physically sent to the provider to be processed.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method for completing jammed automated teller machine (ATM) transactions, the method comprising:
   detecting, by a financial institution transaction system, a failed transaction due to a jammed document deposit;
   generating, by the financial institution transaction system, an incident data packet for the failed transaction;
   notifying, by the financial institution transaction system, a servicer of a jammed document within the ATM;
   generating, by the financial institution transaction system, a scannable code associated with incident data packet information, and causing an ATM to display the scannable code for scanning by a servicer mobile device;
   receiving, by the financial institution transaction system, an image data packet from the servicer mobile device, the image data packet comprising additional transaction information and an image of the jammed document;
   extracting, by the financial institution transaction system, the additional transaction information from the image of the jammed document; and
   completing, by the financial institution transaction system, the failed transaction based on the additional transaction information.

2. The method of claim 1, comprising:
   determining, by one of the financial institution transaction system and the servicer mobile device, quality of the jammed document, wherein the quality of the jammed document is based on at least one of physical condition of document and results of optical character recognition (OCR) operations performed on the image of the jammed document.

3. The method of claim 2, further comprising determining that the quality of the jammed document is above a predetermined threshold prior to completing the failed transaction.

4. The method of claim 1, wherein the incident data packet is electronically linked to the image of the jammed document.

5. The method of claim 1, wherein the image data packet comprises at least one of the image of the jammed document, a name of a depositor, a deposit account, a transaction amount, an ATM identifier of the failed transaction, and time of failed transaction.

6. The method of claim 1, wherein the scannable code is password-protected.

7. The method of claim 1, wherein the scannable code a quick response (QR) code.

8. The method of claim 1, wherein the scannable code comprises a hyperlink navigable to the incident data packet information.

9. A financial institution transaction system, the system comprising:
   an automated teller machine (ATM);
   a servicer device; and
   a provider computing system comprising a network interface and a processing circuit, the network interface structured to facilitate data communication with the ATM and the servicer device via a network, the processing circuit comprising a processor and a memory, the processing circuit structured to:
     detect a failed transaction due to a jammed document deposit;
     generate an incident data packet for the failed transaction;
     notify a servicer of a jammed document within the ATM;
     generate a scannable code associated with incident data packet information, and causing the ATM to display the scannable code for scanning by a servicer mobile device;
     receive an image data packet from the servicer mobile device, the image data packet comprising additional transaction information and an image of the jammed document;
     extract the additional transaction information from the image of the jammed document; and
     complete the failed transaction based on the additional transaction information.

10. The financial institution transaction system of claim 9, configured to:
    determine quality of the jammed document, wherein the quality of the jammed document is based on at least one of physical condition of document and results of optical character recognition (OCR) operations performed on the image of the jammed document.

11. The financial institution transaction system of claim 10, further structured to determine that the quality of the jammed document is above a pre-determined threshold prior to completing the failed transaction.

12. The financial institution transaction system of claim 9, wherein the incident data packet is electronically linked to the image of the jammed document.

13. The financial institution transaction system of claim 9, wherein the image data packet comprises at least one of the image of the jammed document, a name of a depositor, a deposit account, a transaction amount, an ATM identifier of the failed transaction, and time of failed transaction.

14. The financial institution transaction system of claim 9, wherein the scannable code is password-protected.

15. The financial institution transaction system of claim 9, wherein the scannable code a quick response (QR) code.

16. The financial institution transaction system of claim 9, wherein the scannable code comprises a hyperlink navigable to the incident data packet information.

17. A non-transitory computer readable medium having computer-executable instructions embodied therein that, when executed by at least one processor of a computing system, cause the computing system to perform operations to complete jammed ATM transactions, the operations comprising:

detecting a failed transaction due to a jammed document deposit;

generating an incident data packet for the failed transaction;

notifying a servicer of a jammed document within the ATM;

generating a scannable code associated with incident data packet information, and causing an ATM to display the scannable code for scanning by a servicer mobile device;

receiving an image data packet from the servicer mobile device, the image data packet comprising additional transaction information and an image of the jammed document;

extracting the additional transaction information from the image of the jammed document; and completing the failed transaction based on the additional transaction information.

18. The operations of claim 17, comprising:

determining a quality of the jammed document, wherein the quality of the jammed document is based on at least one of physical condition of document and results of optical character recognition (OCR) operations performed on the image of the jammed document;

determining that the quality of the jammed document is above a pre-determined threshold prior to completing the failed transaction.

19. The operations of claim 17, wherein the image data packet comprises at least one of the image of the jammed document, a name of a depositor, a deposit account, a transaction amount, an ATM identifier of the failed transaction, and time of failed transaction.

20. The operations of claim 17, wherein the scannable code is at least one of a password-protected scannable code, a QR code, and a scannable code which comprises a hyperlink navigable to the incident data packet information.

* * * * *